Figure 1:
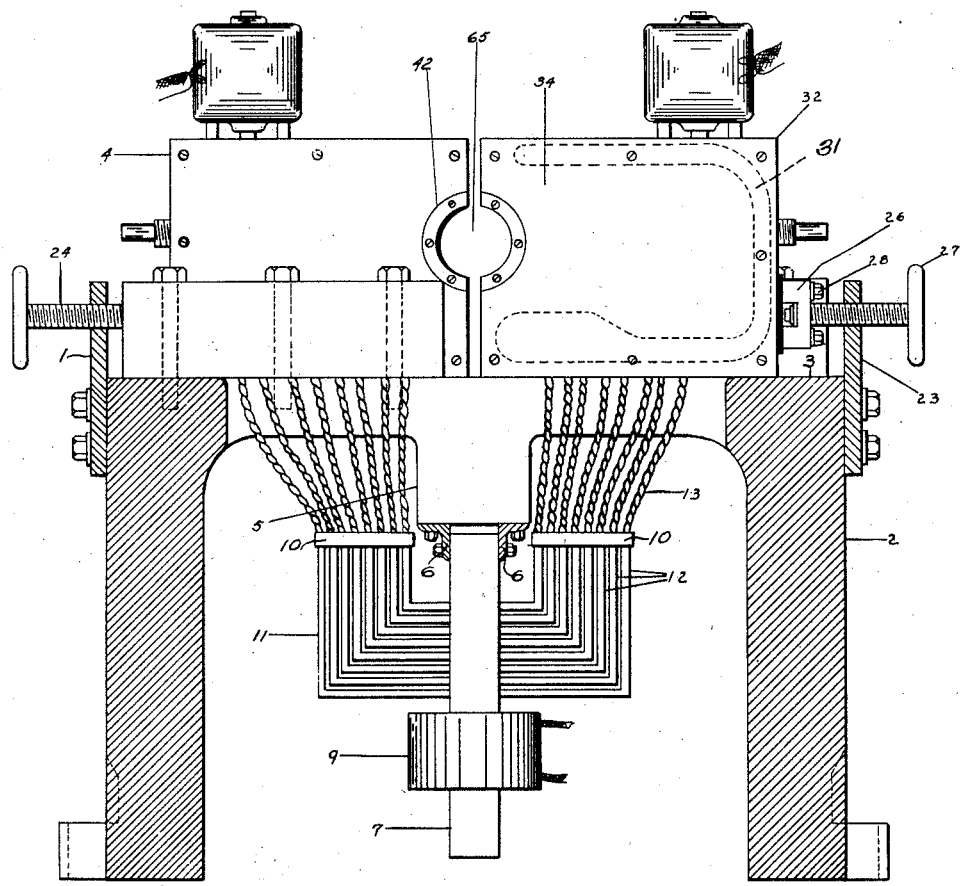

DONALD F. PANCOAST --- INVENTOR.

BY

ATTORNEYS.

DONALD F PANCOAST ----- INVENTOR.

June 21, 1932.  D. F. PANCOAST  1,863,933
ELECTRIC WELDING APPARATUS
Filed Dec. 13, 1927  3 Sheets-Sheet 3

DONALD F. PANCOAST ---- INVENTOR.

BY

ATTORNEYS.

Patented June 21, 1932

1,863,933

UNITED STATES PATENT OFFICE

DONALD F. PANCOAST, OF CLEVELAND, OHIO

ELECTRIC WELDING APPARATUS

Application filed December 13, 1927. Serial No. 239,665.

This invention as indicated relates to an electric welding apparatus. More particularly it comprises an apparatus wherein roller electrodes and the like are dispensed with and an apparatus provided wherein improved current conducting means is supplied and pressure rollers are free to be disposed at the most effective position and where they may act over a large area of circumferential engagement without restriction through lack of space and without interference from the current conducting means. It also includes means whereby the current is conveyed to the work over a substantial area in two directions rather than along a narrow line of contact as has heretofore been the practise. The invention contemplates the use of a liquid metal of adequate current carrying capacity to convey the current to the piece to be welded and thus provide a continuous conductor which will not only provide a large area of contact, but will prevent arcing through the fact that the contact is continuously maintained notwithstanding irregularities in the surface of the work beneath the contacting elements. The invention also contemplates the method of providing pressure rollers at the critical point for effective operation and conductors not interfering with said rollers which will provide for a large area of contact with the work and thus avoid an interrupted or unsatisfactory seam at the conclusion of the welding operation.

The apparatus is particularly adapted for tube welding by the resistance method, but it is not intended to limit the application of the invention to such use inasmuch as in certain aspects the invention is of broader application.

The invention will be illustrated and described in connection with a tube welding apparatus using an alternating current of suitable characteristics such, for example, as current supplied to the electrodes at about eighteen hundred (1800) amperes and at three or four volts, may be used upon tube stock of twenty gauge which then may be traversed through the current path at high speed such as at the rate of about one hundred feet per minute, but it is obvious that the conductors would be capable of carrying current of any character or quality suitable to the work in hand and that the apparatus could be modified for various rates of speed and sizes of tubing or other stock to be operated on. Other and further objects of the invention will appear in the course of the following description. To the accomplishment of the foregoing and related ends, said invention, then, consists of the means, and method hereinafter fully described and particularly pointed out in the claims.

The annexed drawings and the following description set forth in detail certain means and one mode of carrying out the invention, such disclosed means and mode illustrating, however, but several of various applications of the principle of the invention.

Figure 2:
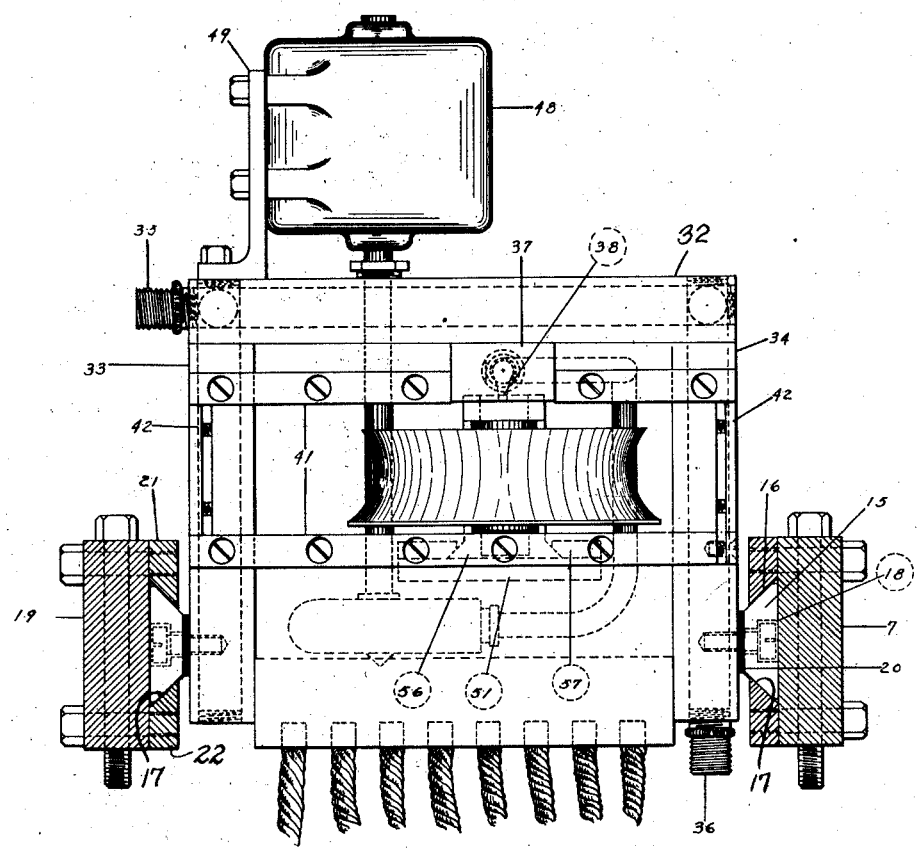
Figure 3:
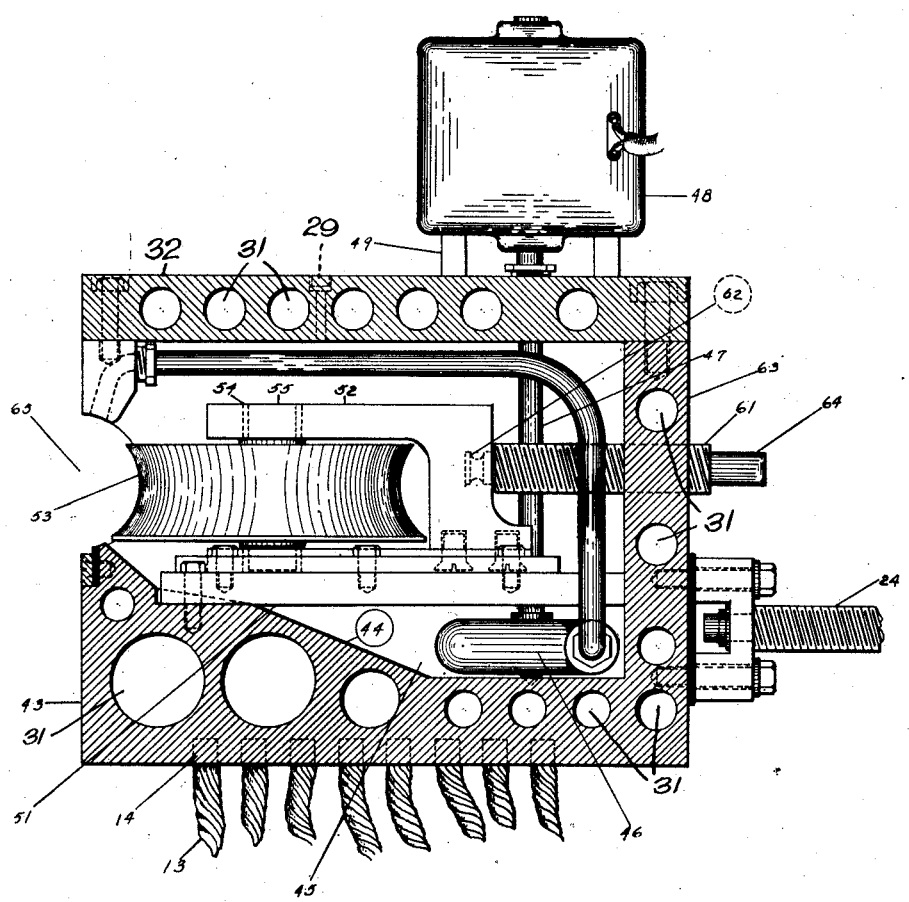

In said annexed drawings:

Fig. 1 is a vertical view partly in section of an apparatus embodying the principle of my invention; Fig. 2 is a front elevation showing one of the pair of companion heads as viewed from the plane of the welding path; and Fig. 3 is an enlarged vertical sectional view taken adjacent the right hand end of the apparatus shown in Fig. 2.

The welding machine indicated generally by the numeral 1, Fig. 1, may be placed in advance of the forming rolls (not shown) and the tube stock will be engaged and moved through the welding path or throat by any suitable feeding means, well known in the art, and other rolls to prevent accidental opening of the seam may be provided on the opposite side of the apparatus, as also will be well understood. The apparatus as shown in Fig. 1 is provided with a frame 2 of heavy construction and adapted to be anchored to a concrete base if desired. A flat top or table 3 open centrally is provided on said frame on which the heads or housings 4 of the pressure rolls and current conductors are adapted to be adjustably supported in insulated relation thereto, as will be presently explained. On the under side of the table, a boss 5 is provided beneath each longitudinal edge which projects downwardly and provides a flat surface to receive angle members or brackets 6 for supporting the laminated core 7 of a step down transformer which is thus housed within said frame. The primary coils 9 of the transformer are mounted upon the vertical side members of the core. The secondary coil 11 comprises a single turn and extends beneath the upper horizontal member of the core. The secondary member is preferably made up of a plurality of copper bars 12 of substantially U-shape and spaced in nested relation to each other by means of insulating supports 10 as is shown in Fig. 1 and to the ends thereof flexible cables 13 are attached, said cables passing through said opening centrally of the table top and secured at their free ends in recesses 14 formed in the base of the respective heads.

The heads as shown in Fig. 2 are provided with slide rails 15 at either side which have beveled edges 16 adapted to be engaged within grooved trackways 17 positioned adjacent thereto and firmly secured in insulated relation by means of insulated bolts 18 and plates of insulation 20, to the adjacent portion of the respective heads. The grooved trackway is preferably formed of a body member 19 and upper and lower flanges 21, 22, which are bolted to the lateral face of said body, said flanges being beveled on their inner edges to engage over the beveled edges of the slide rail heretofore mentioned. In order to provide for the adjustment of said housings toward each other and relatively to the upper surface of the table, extension plates 23 are provided at each side of the frame through which adjusting screws 24 are screw-threadedly engaged, the inner ends of said screws 25 being rotatably engaged in plates 26 secured to the ends of the heads and suitably insulated by means of insulated bolts 28 and plates 29. The adjusting screws are provided with hand wheels 27 to secure any desired degree of adjustment.

The heads or housings 4 are preferably formed of massive copper blocks which may be of increased thickness adjacent the central portion of the apparatus beneath the pressure rolls and the welding throat. The blocks are provided with channels 31 to permit the circulation of a temperature-controlling medium therethrough. The upper portions of the housings are preferably in the form of removable plates 32 in order to afford free access to the interior thereof. The end plates 33, 34, are also removable, as will be noted from the showing in Fig. 2. Through the top plate 32 a passageway 29 is provided for an inert gas to prevent oxidation of the liquid contactor, which as hereinafter explained, may be liquid mercury.

The housing in the construction shown in Figs. 1 and 3 has an integral outer and bottom wall through which longitudinal channels are formed to permit of the circulation of a cooling medium. The removable end and top plates are likewise provided with communicating channels for the cooling fluid. The inlet 35 for the cooling medium is indicated adjacent one upper end plate and the outlet 36 therefor is positioned on the under side of the opposite end plate. The top plate carries adjacent the central upper portion of its open side a block 37 through which an orifice or nozzle 38 for the liquid contactor is formed. The margins of the open portion of the head are lined with suitable packing material such as asbestos strips which are securely anchored in position by means of metal strips 41 at either side of the nozzle and continuously across the lower edge of the open section. Likewise packing strips of arcuate form are clamped between similarly shaped retaining plates 42 engaged with the end plates adjacent the welding throat.

The bottom wall 43 of the housing as has been indicated is of greater thickness adjacent the inner portion thereof and is provided interiorly at said enlarged portion with inclined faces 44 so that the liquid metal used in conducting the current may flow into a well 45 at the rearward lower portion of the housing which thus constitutes a reservoir for the quantity of metal necessary to maintain a continuous jet at the welding point. Within the well of the reservoir, a pump 46 preferably of centrifugal type is located, said pump being driven by means of a shaft 47 extending vertically through the housing and having an electric motor 48 for driving the same, at its upper end, said motor being supported upon a suitable bracket 49 attached to the top plate. Within the housing a slideway 51 is provided upon which a yoke 52 carrying the pressure roll 53 is adapted to be supported. The yoke is provided with bearings 54 to receive the stub shaft 55 of the pressure roll and its base plate 56 is formed with beveled edges adapted to engage beneath beveled flanges 57 bolted to the margins of the slideway. An adjusting screw 61 for the yoke is provided, said screw being rotatably mounted in the outer face 62 of the yoke and being screw-threadedly engaged through the outer wall 63 of the head. A squared end 64 is provided on the adjustment screw for engagement by a wrench or the like.

It will be noted that the nozzles occupy but very small space not over ten percent. of the circumferential extent of the tube stock, adjacent the upper edge of the welding throat and that the pressure rolls are deeply curved so that they encircle the greater portion of the tube stock, approximating seventy percent. of the circumferential extent of the tube stock.

The operation of the device, it is believed, will be obvious from the description of its construction. It should be stated, however, that the temperature controlling medium may in some instances be intended to have a cooling action, whereas in other instances it may be necessary to provide a heating effect. Thus, if mercury is used as the current conducting medium, cooling water will be circulated through the walls of the head, whereas if tin or some other metal of relatively low melting point, or some suitable alloy such as Rose metal or Wood's metal is used, as the current conducting medium, the same will have to be maintained in a liquid condition through the use within the head of a heating medium. The details of the mechanism for cooling the circulating fluid or for heating the head, and for producing rapid circulation through the various channels may be of any character such devices being well known and forming no part of the present invention.

When the tube stock is engaged within the welding throat 65 and suitable pressure is applied through the adjustment of the pressure rolls and the heads with reference to each other, the current is switched on and the motor proceeds to circulate the current-conducting medium through the conduits leading to the nozzle whence it flows into close contact with the adjacent edge of the tube stock to be welded forming a broad area of contact longitudinally at each point and thence flowing downwardly and coming into contact with the asbestos strip adjacent the lower edge of the throat where it is deflected inwardly into the well at the base of the housing where it again reenters circulation through the intake orifices of the centrifugal pump. The abutting edges of the tube stock are heated to welding temperature and are united through the action of the pressure rolls. Any metal adhering to the tube will also be deflected into the housing as it emerges through the end plates at the end of the housing toward which the welded tube is moving. The asbestos packing at the opposite end of the welding throat is also maintained in full contact with the tube to prevent the escape of mercury vapor, in the event that mercury is used as the electrode, and to confine the heat within the reservoir.

The method involved in the invention comprises the steps of carrying the current to a point closely adjacent to the edge of the tube stock so that maximum efficiency and economy of the apparatus may be produced. It has been recognized as desirable to have the point of application of the current to the tube stock as close to the edges of the stock as possible without producing undue arcing. By means of the liquid contacting medium, substantially continuous contact is at all times maintained and the spread of the liquid over the adjacent surface of the tube may be regulated through the proper proportioning of the nozzle capacity so that greater speed of operation may be secured than through the use of electrodes less effective in character. The method also includes the step of returning the liquid contacting medium to the nozzle for continuous use so that expensive replacement is avoided and simplicity in the construction of the apparatus is attained. It also includes associating a current-carrying means with a pressure-applying means whereby the area of contact of the pressure-applying means may be increased circumferentially to almost the maximum possible extent without in any way affecting the adequacy of the remaining portions of the apparatus to carry out their respective functions.

The orifice of the jet may be so shaped as to provide for contact for an appreciable distance longitudinally of the seam line of the tube thereby completely avoiding any stitch effect in the completed weld. The rate of supply of the jet to the tube margin may be accurately controlled through regulation of the motor speed of the centrifugal pump as well as through the providing of the proper passageways for the nozzle supply.

Other modes of applying the principle of my invention may be employed instead of the one explained, change being made as regards the means and the steps herein disclosed provided those stated by any one of the following claims or their equivalents be employed or embodied therein.

I therefore particularly point out and distinctly claim as my invention:

1. An apparatus for tube welding by means of an electric current, having in combination adjustable pressure rolls oppositely disposed and adapted to receive between them the tube stock to be welded and having substantially continuous contact with the tube stock over seventy per cent. of its circumferential extent, and fluid contact means for conducting current to opposite sides of the seam line of the tube stock.

2. An apparatus for tube welding by means of an electric current, having in combination adjustable pressure rolls oppositely disposed and adapted to receive between them the tube stock to be welded and having substantially continuous contact with the tube stock over seventy per cent. of its circumferential extent and having fluid current conducting elements of less than ten per cent. of the circumferential extent of the tube stock with a longitudinal area of contact along the seam line for conducting current to opposite sides of the seam line.

3. An apparatus of the character described, having in combination a base, a pair of complementary head members mounted on said base, a reservoir within each head member, a pressure roller mounted within each head member said pressure rollers forming a welding throat within which is received the tube stock to be welded, a nozzle mounted above each pressure roller in a position adjacent one edge of the tube stock, a conduit connected with each nozzle and having its opposite end projecting into said reservoir, and means for carrying current-conducting liquid from said reservoir to said nozzle.

4. An apparatus of the character described, having in combination a base, a pair of complementary head members mounted on said base, a reservoir within each head member, a pressure roller mounted within each head member and adjustable laterally thereof, said pressure rollers forming a welding throat within which is received the tube stock to be welded, a nozzle mounted above each pressure roller in a position adjacent one edge of the tube stock, a conduit connected with each nozzle and having its opposite end projecting into said reservoir, and means for carrying current-conducting liquid from said reservoir to said nozzle.

5. In an apparatus of the character described, the combination of a base, a pair of head members mounted on said base and adapted to receive between them tube stock to be welded, each head member comprising a housing formed of conducting material and providing a chamber centrally thereof, an enclosed passageway formed between said head members, and having members engaging said tube stock to make substantially liquid tight contact therewith, a pair of pressure rollers engaging said tube stock within said passageway, and a pair of nozzles projecting above said respective pressure rollers and adapted to supply jets of liquid current-conducting material through said nozzles adjacent the seam line.

6. A welding apparatus having in combination a pair of heads disposed opposite each other and adapted to receive between them the tube stock to be welded, pressure applying means adapted to contact with the tube stock, and means associated with each terminal of an electric circuit for establishing contact with the tube stock through a stream of liquid metal projected from said head members.

7. A welding apparatus having in combination a pair of heads disposed opposite each other and adapted to receive between them the tube stock to be welded, pressure rollers carried by said heads and adapted to contact with the tube stock, and means adjacent each of said pressure rollers associated with each terminal of an electric circuit for establishing contact with the tube stock through a stream of liquid metal projected from said head members.

8. A current conductor for electric welding machines comprising a hollow head member open adjacent one side, a pressure roller mounted within said head member and adapted to be moved relatively to said open side, a nozzle member positioned above said pressure rollers, and means for supplying current conducting liquid from said hollow head to said nozzle.

9. A current conductor for an electric welding machine, comprising a housing formed of heavy, current conducting material, a reservoir provided interiorly of said housing, a pressure roller slidably mounted transversely of said housing, means adapted to adjust said pressure roller laterally of said housing, an open passageway provided adjacent one side of said housing adjacent said pressure roller, a liquid contactor nozzle mounted above said pressure roller, and means for continuously circulating conducting liquid through said nozzle to the work engaged by said pressure roller.

10. A device for conducting current in a welding apparatus which comprises a head member forming a circuit terminal and a liquid metal jet associated with said head member to carry the current to the work.

Signed by me this 7th day of December, 1927.

DONALD F. PANCOAST.